(12) United States Patent
Maenpaa (10) Patent No.: US 9,024,576 B2
(45) Date of Patent: May 5, 2015

(54) INDUCTIVE CHARGING OF A RECHARGEABLE BATTERY

(75) Inventor: Ossi E. Maenpaa, Salo (FI)

(73) Assignee: Nokia Technologies Oy, Espoo (FI)

(*) Notice: Subject to any disclaimer, the term of this patent is extended or adjusted under 35 U.S.C. 154(b) by 608 days.

(21) Appl. No.: 13/298,709

(22) Filed: Nov. 17, 2011

(65) Prior Publication Data

US 2013/0127404 A1    May 23, 2013

(51) Int. Cl.
    *H02J 7/00*    (2006.01)
    *H02J 7/02*    (2006.01)

(52) U.S. Cl.
    CPC ..................................... *H02J 7/025* (2013.01)

(58) Field of Classification Search
    CPC ........ H02J 7/025; H01F 38/14; Y02T 90/122; B60L 11/182; Y02E 60/12
    USPC ......................................................... 320/108
    See application file for complete search history.

(56) References Cited

U.S. PATENT DOCUMENTS

| | | | |
|---|---|---|---|
| 6,951,305 B2 | 10/2005 | Overhultz et al. | 235/487 |
| 7,274,292 B2 | 9/2007 | Velhal et al. | 340/539.32 |
| 7,418,106 B2 | 8/2008 | Greuet et al. | 381/331 |
| 2003/0152243 A1 | 8/2003 | Julstrom et al. | 381/315 |
| 2006/0133633 A1 | 6/2006 | Hyvonen | 381/315 |
| 2009/0285426 A1 | 11/2009 | Boguslavskij | 381/323 |
| 2010/0164296 A1* | 7/2010 | Kurs et al. | 307/104 |
| 2010/0164826 A1* | 7/2010 | Szini et al. | 343/841 |
| 2010/0201513 A1* | 8/2010 | Vorenkamp et al. | 340/539.13 |
| 2011/0050164 A1 | 3/2011 | Partovi et al. | 320/108 |

FOREIGN PATENT DOCUMENTS

| | | |
|---|---|---|
| CN | 101232124 A | 7/2008 |
| EP | 2026406 A1 | 2/2009 |
| WO | WO-2007/032890 A1 | 3/2007 |
| WO | WO 2009/122355 A2 | 10/2009 |
| WO | WO 2010/093969 A2 | 8/2010 |
| WO | WO-2011/095841 A2 | 8/2011 |

OTHER PUBLICATIONS

Elizabeth Woyke, "Powermat Combining NFC Mobile Payments With Wireless Charging", Forbes, Feb. 24, 2011, 5 pgs.

* cited by examiner

*Primary Examiner* — Arun Williams
(74) *Attorney, Agent, or Firm* — Harrington & Smith (57) ABSTRACT

An apparatus including an inductive charging system and at least one wireless communication system. The inductive charging system is configured to charge a rechargeable battery. The inductive charging system has an induction coil. The at least one wireless communication system is configured to communicate with a device. The wireless communication system includes at least a portion of the induction coil for transmitting and/or receiving a wireless signal at the induction coil, or for generating a communication electromagnetic field at the induction coil. Thus, both the inductive charging system and the wireless communication system include at least a portion of the induction coil as a common component for both of the systems.

16 Claims, 11 Drawing Sheets

INDUCTIVE CHARGING OF A RECHARGEABLE BATTERY

BACKGROUND

1. Technical Field

The exemplary and non-limiting embodiments relate generally to an apparatus having both an inductive charging system and a wireless communication system and, more particularly, to a common component used in the systems.

2. Brief Description of Prior Developments

Portable hand-held devices, such as mobile telephones for example, are know which comprise wireless charging, Near-Field Communication (NFC) and Hearing Aid Compatibility (HAC).

SUMMARY

The following summary is merely intended to be exemplary. The summary is not intended to limit the scope of the claims.

In accordance with one aspect, an apparatus is provided including an inductive charging system and at least one wireless communication system. The inductive charging system is configured to charge a rechargeable battery. The inductive charging system has an induction coil. The at least one wireless communication system is configured to communicate with a device. The wireless communication system includes at least a portion of the induction coil for transmitting and/or receiving a wireless signal at the induction coil, or for generating a communication electromagnetic field at the induction coil. Thus, both the inductive charging system and the wireless communication system include at least a portion of the induction coil as a common component for both of the systems.

In accordance with another aspect, a method comprises providing an apparatus comprising an inductive charging system configured to charge a rechargeable battery, where the inductive charging system comprises an induction coil; and providing the apparatus with at least one wireless communication system, where a first one of the wireless communication system comprises at least a portion of the induction coil, where the wireless communication system is configured to use the induction coil to communicate with a device.

In accordance with another aspect, a method comprises using an inductive charging system to charge a rechargeable battery of an apparatus, where the inductive charging system comprises an induction coil; and using the induction coil as part of a wireless communication system to generate a communication electromagnetic field from the induction coil, or to transmit and/or receive a wireless signal at the induction coil.

In accordance with another aspect, a non-transitory program storage device readable by a machine, tangibly embodying a program of instructions executable by the machine for performing operations is provided, the operations comprising charging a rechargeable battery of an apparatus by an inductive charging system comprises an induction coil; and communicating with a device by use of the induction coil, where the induction coil generates a communication electromagnetic field from the induction coil, or to transmit and/or receive a wireless signal at the induction coil.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
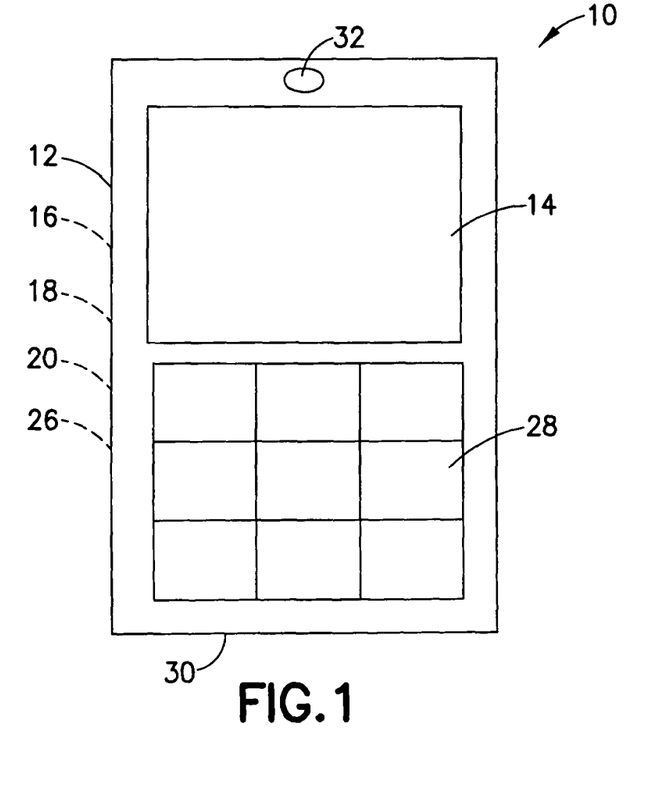
FIG. 1 is a front view of an example embodiment.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 2:
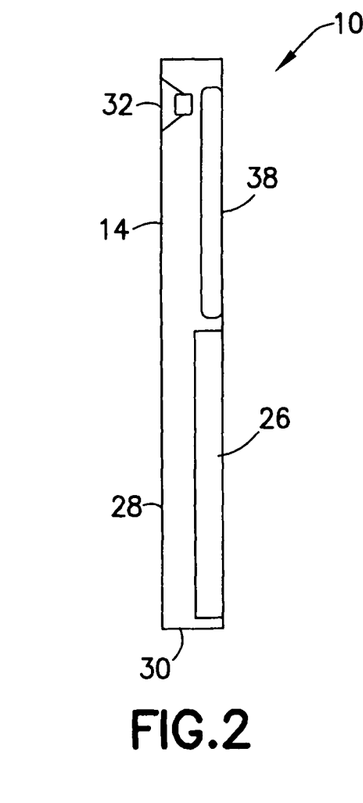
FIG. 2 is a side view of the example shown in FIG. 1.

Referring also to FIG. 2, the apparatus 10 is a hand-held communications device which includes a telephone application. The apparatus 10 can also comprise an Internet browser application, camera application, video recorder application, music player and recorder application, email application, navigation application, gaming application, and/or any other suitable electronic device application. The apparatus 10, in this example embodiment, comprises a housing 12, a display 14, a receiver 16, a transmitter 18, a rechargeable battery 26, and a controller 20 which can include (referring also to FIG. 7) at least one processor 22, at least one memory 24, and software. However, all of these features are not necessary to implement the features described below.

The display 14 in this example is a touch screen display which functions as both a display screen and as a user input. However, features described herein could be used in a display which does not have a touch, user input feature. The user interface also includes a keypad 28. However, the keypad might not be provided if a touch screen is used. The electronic circuitry inside the housing 12 comprises a printed wiring board (PWB) having components such as the controller 20 thereon. The circuitry includes a sound transducer 30 provided as a microphone and a sound transducer 32 provided as a speaker or earpiece. The housing 12 has sound holes for sound to travel to and from the sound transducers through the housing 12.

Figure 3:
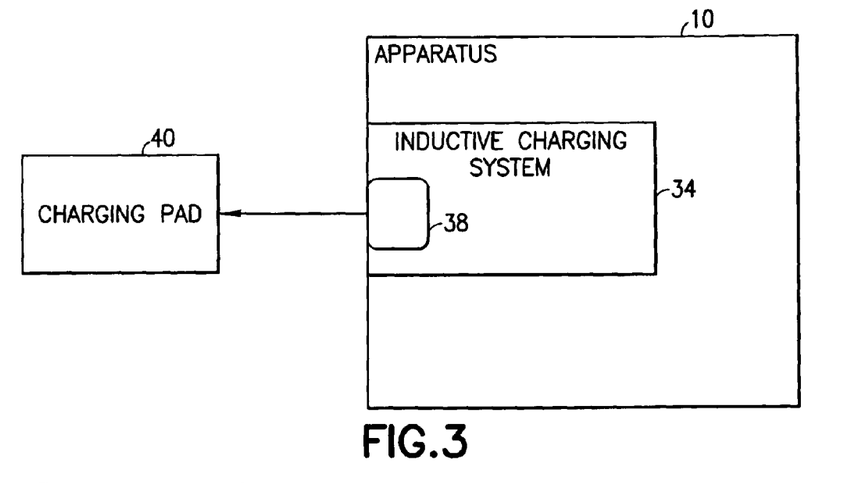
FIG. 3 is a diagram illustrating connection of the apparatus shown in FIG. 1 to a charging station for inductive charging.

Referring also to FIG. 3, the apparatus 10 comprises an inductive charging system 34. The inductive charging system 34 provides a means to allow the rechargeable battery 26 to be recharged by use of inductive charging. Inductive charging uses an electromagnetic field to transfer energy between two objects. This is usually done with a charging station, such as charging pad 40 for example. Energy is sent through inductive coupling to an electrical device (the apparatus 10), which then can use that energy to charge battery(ies).

The inductive charging system 34 comprises an induction coil 38. This induction coil 38 cooperates with a coil in the charging station 40 to induce a current in the coil 38. This current can be used to recharge the battery 26. Because there is a small gap between the two coils employed in each of the sender and receiver of the energy within the respective devices, inductive charging is considered a short-distance "wireless" energy transfer, because it frees the user from having to deal with wires between the two devices.

Figure 4:
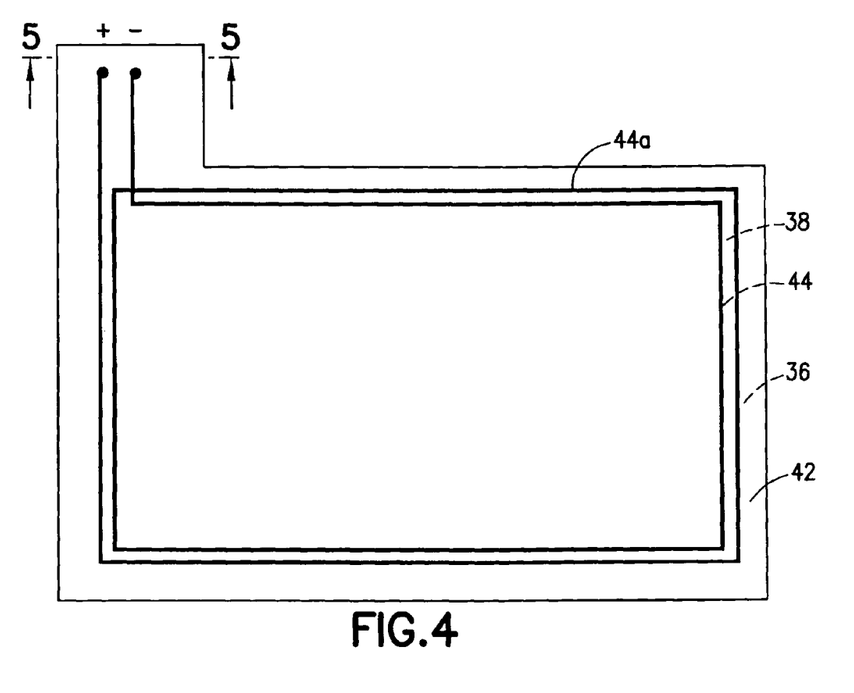
FIG. 4 is a plan view of a flex circuit used as the induction coil shown in FIGS. 2 and 3.
Figure 5:
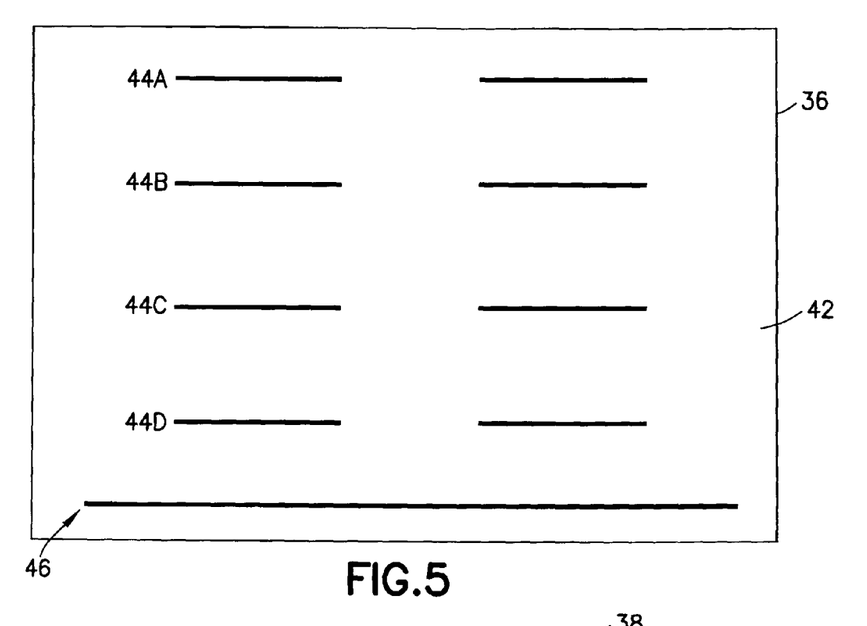
FIG. 5 is a cross sectional view taken along line 5-5 in FIG. 4.
Figure 6:
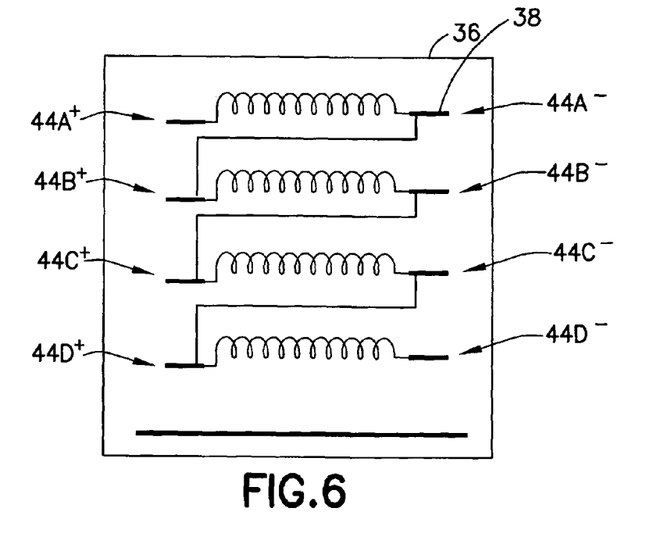
FIG. 6 is a schematic view illustrating components of the flex circuit shown in FIGS. 4-5.

Referring also to FIGS. 4-6, in this example embodiment the induction coil 38 is provided as a flex circuit 36 with the substrate 42 and the conductive traces or coil sections 44. FIG. 4 shows a top view of flex-printed coil. From this perspective there seems to be just one trace 44. However, as seen in FIG. 5, there are actually multiple coil layers; 44A-44D; one coil section as each one of the layers. These layers 44A-44D are electrically isolated from each other, but can be connected, such as by use of a switcher(s) for example if needed. In this example the flex circuit 36 also includes a ferrite layer 46, such as in a bottom (turn-side of flex). For example, there could be a ferrite coating covering the whole bottom side of the flex area. However, in an alternate embodiment the ferrite layer 46 might not be provided on the flex circuit 36.

FIG. 4 shows each trace 44 as having two loops or rounds. However, as illustrated in FIG. 6, any suitable number of loops or rounds could be provided in each layer trace 44 between the "+" and "−" terminals of the layer traces 44. Less than two loops could be provided, and the different layer traces 44A-44D might not have a same number of loops. In alternate embodiments more or less than four coil layers 44 could be provided. In addition, one or more of the coil sections 44 might not be provided as layers. In this example, each layer 44A-44D has a corresponding pair of "+" and "−" terminals: $44A^+$, $44A^-$; $44B^+$, $44B^-$; $44C^+$, $44C^-$; $44D^+$, $44D^-$. In this example embodiment, the inductive charging system 34 is adapted to connect two or more of the traces 44 in parallel to form the inductive coil 38, such as by use of switchers for example.

Figure 7:
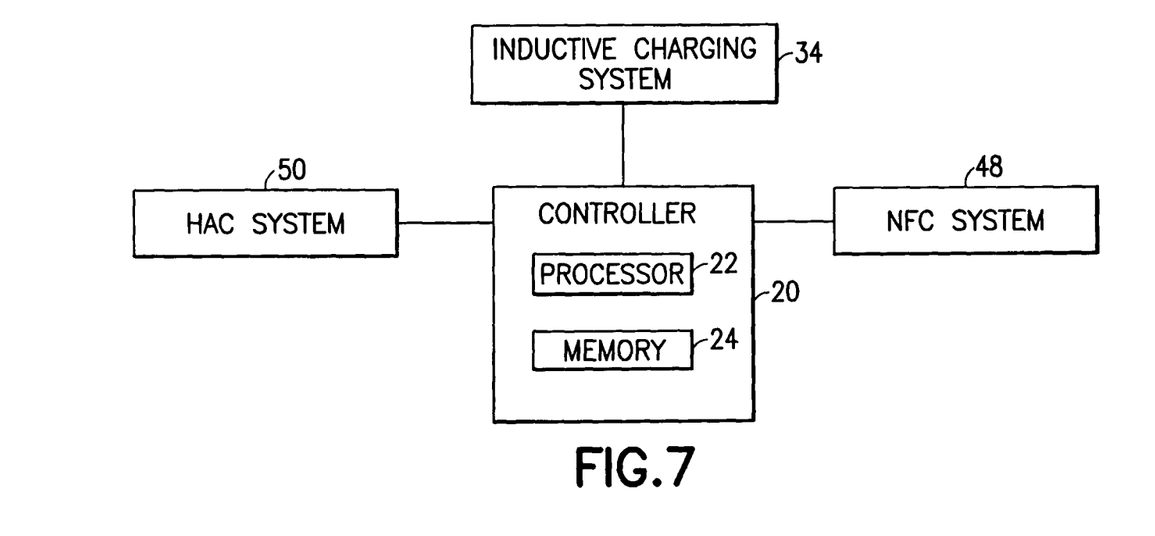
FIG. 7 is a diagram illustrating various systems and components of the apparatus shown in FIG. 1.

Referring also to FIG. 7, the apparatus 10 comprises a Near Field Communication (NFC) system 48 and a Hearing Aid Compatibility (HAC) system 50. Each one of these systems 48, 50 form a wireless communication system for communicating with another device. The NFC system 48 can communicate with a NFC tag or device 52. The HAC system 50 can communicate with a hearing aid 54.

Near field communication, or NFC, allows for simplified transactions, data exchange, and wireless connections between two devices in close proximity to each other, usually by no more than a few centimeters. Many smartphones currently on the market already contain embedded NFC chips that can send encrypted data a short distance ("near field") to a reader located, for instance, next to a retail cash register. Shoppers who have their credit card information stored in their NFC smartphones can pay for purchases by waving their smartphones near or tapping them on the reader, rather than bothering with the actual credit card. As seen in FIG. 2, the induction coil 38 is provided proximate the rear side of the housing 12 at the top of the apparatus 10. This allows a user to merely place the apparatus 10 on the charging pad 40 with the display 14 facing up.

The Near Field Communication Forum (NFC Forum) formed in 2004 promotes sharing, pairing, and transactions between NFC devices and develops and certifies device compliance with NFC standards. A smartphone or tablet with an NFC chip could make a credit card payment or serve as keycard or ID card. NFC devices can read NFC tags on a museum or retail display to get more information or an audio or video presentation. NFC can share a contact, photo, song, application, or video or pair Bluetooth devices.

NFC is a set of short-range wireless technologies, typically requiring a distance of 4 cm or less. NFC operates at 13.56 MHz on ISO/IEC 18000-3 air interface and at rates ranging from 106 kbit/s to 424 kbit/s. NFC always involves an initiator and a target; the initiator actively generates an RF field that can power a passive target. This enables NFC targets to take very simple form factors such as tags, stickers, key fobs, or cards that do not require batteries. NFC peer-to-peer communication is of course possible, where both devices are powered.

NFC tags contain data and are typically read-only, but may be rewriteable. They can be custom-encoded by their manufacturers or use the specifications provided by the NFC Forum, an industry association charged with promoting the technology and setting key standards. The tags can securely store personal data such as debit and credit card information, loyalty program data, PINs and networking contacts, among other information. The NFC Forum defines four types of tags which provide different communication speeds and capabilities in terms of configurability, memory, security, data retention and write endurance. Tags currently offer between 96 and 512 bytes of memory.

As with proximity card technology, near-field communication uses magnetic induction between two loop antennas located within each other's near field, effectively forming an air-core transformer. It operates within the globally available and unlicensed radio frequency ISM band of 13.56 MHz. Most of the RF energy is concentrated in the allowed 14 kHz bandwidth range, but the full spectral envelope may be as wide as 1.8 MHz when using ASK modulation. Theoretical working distance of a near field communication system with a compact standard antennas is up to 20 cm, but with a practical working distance of about 4 centimeters or less.

There are two modes:
   Passive communication mode: The initiator device provides a carrier fields and the target device answers by modulating the existing field. In this mode, the target device may draw its operating power from the initiator-provided electromagnetic field, thus making the target device a transponder.

Active communication mode: Both initiator and target device communicate by alternately generating their own fields. A device deactivates its RF field while it is waiting for data. In this mode, both devices typically have power supplies.

NFC employs two different codings to transfer data. If an active device transfers data at 106 kbit/s, a modified Miller coding with 100 percent modulation can be used. In all other cases Manchester coding can be used with a modulation ratio of 10 percent. NFC devices are able to receive and transmit data at the same time. Thus, they can check for potential collisions if the received signal frequency does not match with the transmitted signal's frequency.

Figure 8:
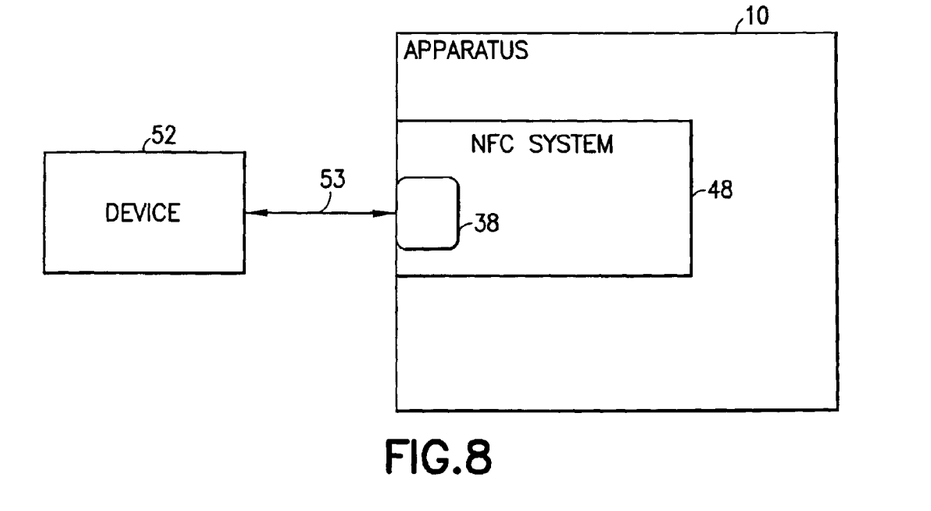
FIG. 8 is a diagram illustrating connection of the apparatus shown in FIG. 1 to a device with Near Field Communication.

Referring also to FIG. 8, in this example embodiment the NFC system 48 uses at least part of the induction coil 38 as the NFC antenna. Because the coil 38 is provided proximate the rear side of the housing 12 at the top of the apparatus 10, it can be located in the rear side of a top part of the phone to allow easy touching of an NFC tag on another device 52 when the phone 10 is in hand in normal usage position (rear of phone in the user's palm, and the display 14 facing towards the user). The earpiece loudspeaker 32 can be located in a top part of the phone to maximize distance between the earpiece 32 and microphone 30 (to minimize acoustic echo).

As can be seen in FIG. 4, the induction coil 38 is a relatively large loop. The coil 38 could be provided on a printed wiring board for example. In another example, the coil 38 could be formed on the rear housing piece of the housing 12.

Figure 9:
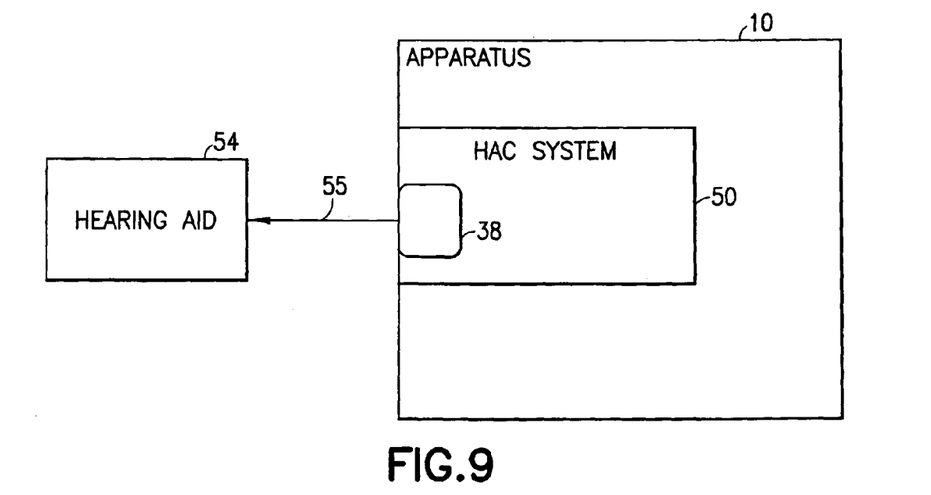
FIG. 9 is a diagram illustrating connection of the apparatus shown in FIG. 1 to a hearing aid with Hearing Aid Compatibility.

Referring also to FIG. 9, as noted above the apparatus 10 also includes a Hearing Aid Compatibility (HAC) system 50. A Hearing Aid Compatibility (HAC) system is a system to interconnect a phone magnetically into a hearing aid device. In the past, a telecoil or T-coil of the HAC system was mounted inside both the hearing aid and the audio device such as the telephone handset. It allowed the signals to be coupled from the phone to the hearing aid without a wired electrical connection and it avoids the problems that microphones would have with the amplification of background noise.

A telecoil is an induction coil. Placed in an alternating magnetic field, an alternating electrical current is "induced" in the copper wire. (Reciprocally, an electrical current in a wire creates a tiny magnetic field around it.) What happens is that the coil converts (changes) magnetic energy to electrical energy, in much the same way that a microphone converts sounds waves to electrical energy. Generally, the strength of the inductive pick-up is determined by the number of turns of the copper wire around the metal axis rod. Larger rods permit more turns and more powerful telephone coils. Newer "T" coils include an integrated amplifier, which makes it feasible to reduce the physical size of the "T" coil.

When a hearing aid is switched to the "T" position, the telecoil is set to detect only an electromagnetic field. The strength of the electrical current "induced" in the telecoil by the electromagnetic field is directly proportional to both the energy in the magnetic field and to the relative positions of the induction coil in the hearing aid to the magnetic field (in a telephone or wire loop). This latter consideration is particularly important; in some positions, little or no electrical current will be created in the induction coil. The magnetic field will simply "pass through" the coil without producing much, if any, electrical current. This is the reason why experienced hearing aid users always experiment with the positioning with unfamiliar telephones: to find the "hot spot" where the strongest signal is heard.

The Hearing Aid Compatibility (HAC) system 50 in the example embodiment shown does not have a telecoil. Instead, as shown in FIG. 9, the HAC system 50 uses at least a portion of the induction coil 38 of the induction charging system as the coil for the HAC system 50. Thus, the coil 38 is used for three purposes or functions: 1. as the induction coil for the induction charging system 34, 2. as the NFC antenna for the NFC system 48, and 3. as the HAC coil for the HAC system 50. As seen in FIG. 9, the user can hold the phone 10 up to his/her ear at the hearing aid 54 to allow magnetic signals from the coil 38 to be received by the telecoil in the hearing aid 54.

Mobile phones and in particular audio transducers (i.e. moving coil) generate certain levels of magnetic field. The field strength is due to several factors some of which are related to transducer design, other electronic components in close proximity, transducer integrations, etc. The field strength is also utilized for HAC wherein handsets are designed to meet some required ratings (i.e. known as 'M' and 'T' ratings when the handsets are used with hearing aid devices). The conventional solutions for meeting these requirement is to employ a larger earpiece component and/or additional coils connected either in series or parallel with the earpiece component. However, it is known that these known solutions are complex integrations, require more space and increases component cost.

An example embodiment comprising features described herein can utilize an induction coil (wherein the induction coil is already available for use in an inductive charging system) for the purpose of speech call suitable for hearing aid users. Advantages of such an example embodiment include reduced cost of manufacture and a product design suitable for HAC requirement without adding further component and complexity.

An example embodiment relates to utilization of an inductive charging system which gives a specification for coil size and placement in a product. Such coil 38 in the example embodiment is assumed to be a large (but thin); open air-filled coil printed on a flex or PWB, and optimized for inductive charging usage. This kind of coil has compromised efficiency in HAC usage, but provides a larger usage area which is easier to place against the ear for HAC use. The coil does not need a magnetic core, so it can be a smaller size (such as a discrete component soldered into a PWB). In other words, even though the coil is used for HAC, it does not need to be a telecoil. A telecoil has a better efficiency in HAC, but does not meet inductive charging specifications. A telecoil also has a very small "hot-spot" in HAC usage; meaning that the user has to move phone to find feasible audio signal. Use of the induction coil as the coil for the HAC system provides a much larger hot-spot because of the much larger size of the inductive charging system coil versus a conventional telecoil.

The drawings show how an inductive charging system coil 38 and a hearing aid earpiece 54 could be located to make Hearing Aid Compatibility by driving an audio signal to inductive charging system coil. FIGS. 1 and 2 illustrate a mono-block phone with a traditional keypad, but the same design criteria can be used also for other product concepts (such as touch displays, folded phones, etc.).

According to Hearing Aid Compatibility standards, the HAC signal is measured nearby the acoustical earpiece to allow the hearing aid users to keep the phone in a normal hand-portable usage position. When the phone 10 is located with its earpiece section at the hearing aid 54, the magnetic field created with the coil 38 is strong enough to fulfill HAC compliance requirements. The coil 38, in this example, is not located in the battery cover because the battery current (especially with GSM) can create a lot of disturbances into the audio frequency area.

Originally HAC was meant to work with a magnetic field generated by a phone earpiece section (at the sound transducer/speaker), but as sizes of earpieces are becoming very small, HAC performance is being reduced. An example embodiment can comprise increased HAC performance without an additional (big and expensive) transmitter coil. Inductive charging and NFC applications are normally not used when the phone is used for speech calls. In a call-mode, the phone can be HAC compliant by driving the coil 38 with the audio signal.

The big-size coil 38 can give a good HAC performance. NFC antenna and HAC transmitter functionality (provided by the coil 38) can be in the top-part of the phone to obtain a good user experience. These two functionalities can use at least some of the same components to get smaller products and save component cost. The coil 38 can be relatively flat, with an area of about 20 mm×30 mm for example. An additional HAC coil on the other hand is about 8×2×2 mm which can be eliminated to thereby reduce component costs. The audio amplifier signal (such as a IHF amplifier output) can be routed to the coil 38. A small-value resistor might be added to ensure high enough load impedance to amplifier in case the audio comes from a normal audio amplifier.

With implementation of at least some of the features described above, a smaller product size and cost can be provided compared to phones with an additional HAC coil. Better HAC performance can be provided than in phones where the HAC signal is generated with an earpiece magnetic field. If a higher magnetic field is needed to reach a better signal-to-noise ratio, the coil 38 can also be driven with levels without compression. With an earpiece size-optimized telecoil this is not possible because power handling capacity is more limited. Power handling capacity would be a problem if one were to try to reach HAC compliancy by using an acoustical earpiece as a source for the magnetic field.

Figure 10:
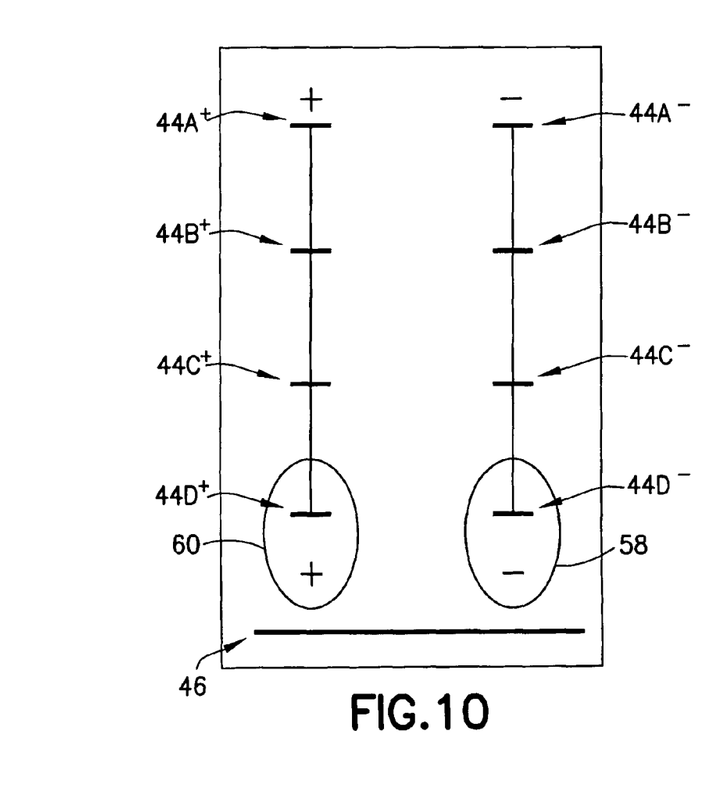
FIG. 10 is a diagram similar to FIG. 5 showing use of the coil loops for inductive charging.
Figure 11:
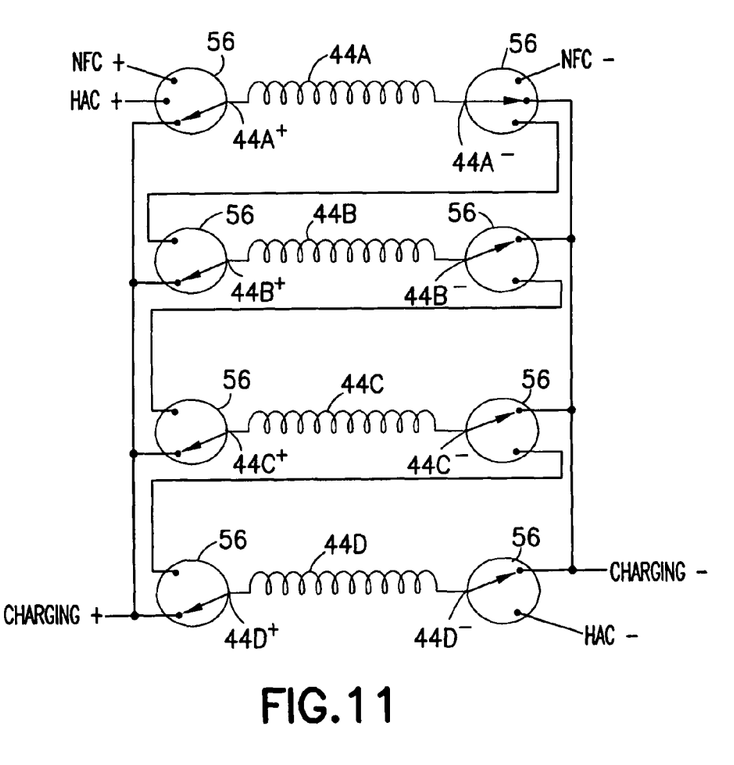
FIG. 11 is a diagram related to FIG. 10 showing use of switchers of the apparatus to provided the electrical connection shown.

Referring particularly to FIGS. 10-11, use of the coil 38 in the inductive charging system 34 for only a charging feature or application can be understood. In this example embodiment the terminals of the traces 44 are connected to switchers 56. The switchers 56 are activated by the controller 20 to connect the traces 44A-44D in parallel. Thus, all of the traces 44 can be used as the induction coil for the inductive charging system. The terminals 44D⁻ and 44D⁺ act as the input 58 and output 60 for charging.

Figure 12:
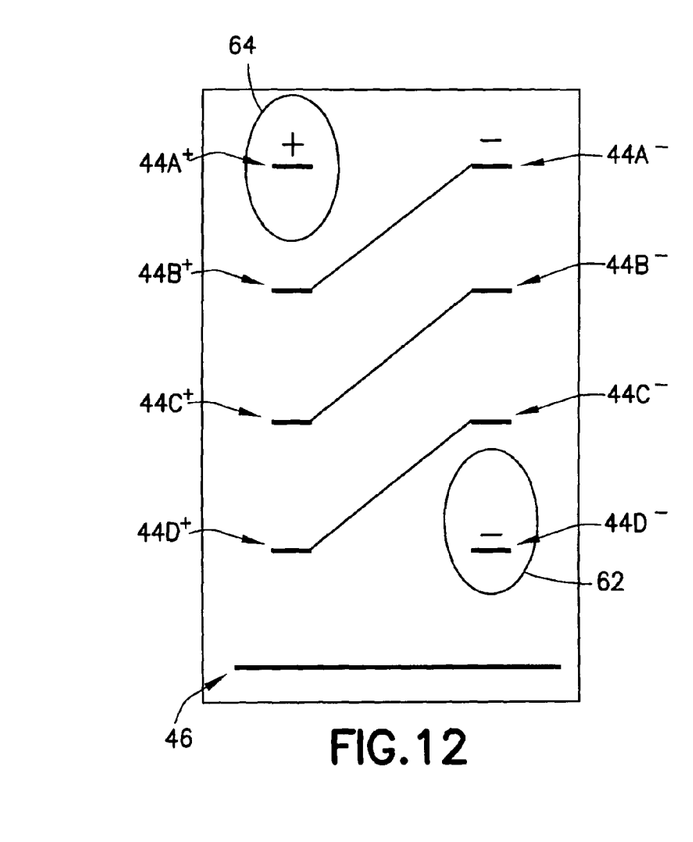
FIG. 12 is a diagram similar to FIG. 10 showing use of the coil loops for Hearing Aid Compatibility.
Figure 13:
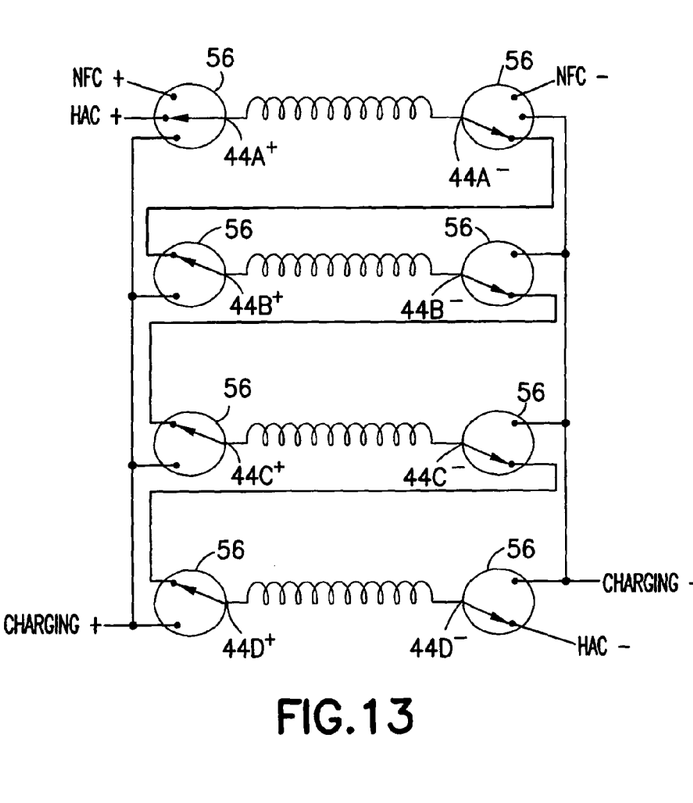
FIG. 13 is a diagram related to FIG. 12 showing use of the switchers of the apparatus to provided the electrical connection shown.

Referring particularly to FIGS. 12-13, use of the coil 38 in the HAC system 50 for only an HAC feature or application can be understood. The switchers 56 are activated by the controller 20 to connect the traces 44A-44D in series. Thus, all of the traces 44 can be used as the coil for the HAC system. The terminals 44A⁻ and 44D⁺ act as the input 62 and output 64 for transmission from the coil 38 to the hearing aid 54 in a HAC mode. Two of the switchers are shown connected to HAC+ and HAC−.

Figure 14:
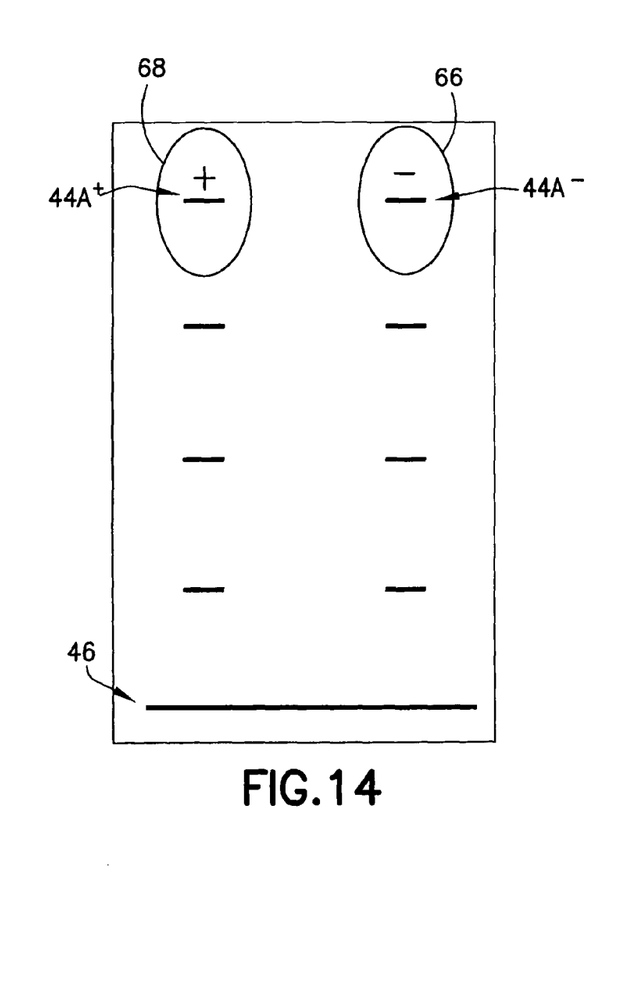
FIG. 14 is a diagram similar to FIG. 10 showing use of the coil loops for Near Field Communication.
Figure 15:
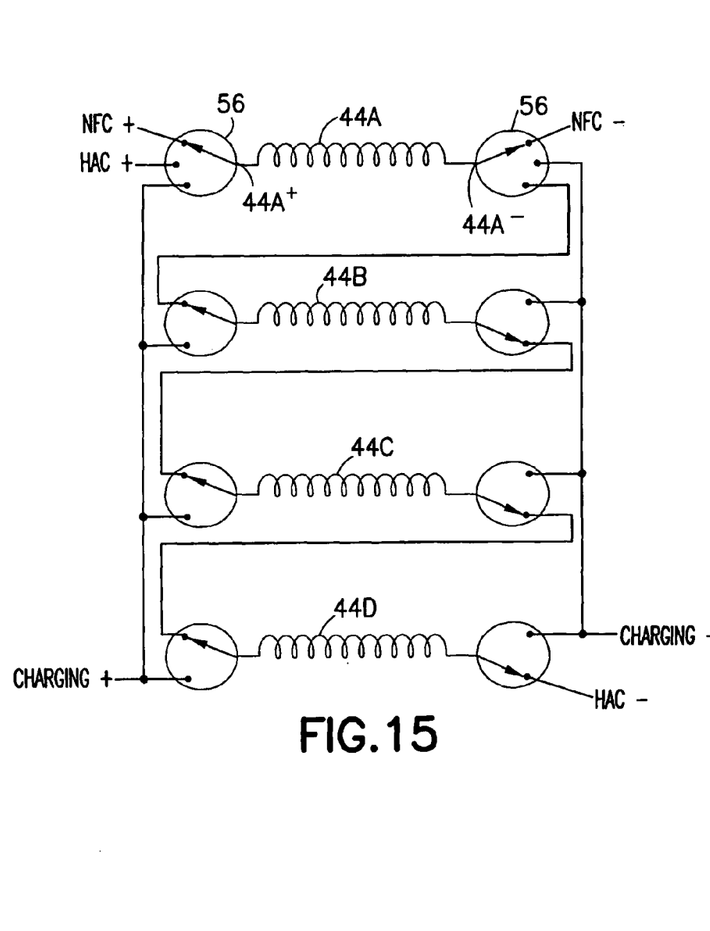
FIG. 15 is a diagram related to FIG. 14 showing use of the switchers of the apparatus to provided the electrical connection shown.

Referring particularly to FIGS. 14-15, use of the coil 38 in the NFC system 48 for only a NFC feature or application can be understood. The switchers 56 are activated by the controller 20 to connect on the top trace 44A to the NFC+ and NFC−. The rest of the traces 44B-44D are not properly connected to anything. Thus, less than all of the traces 44 can be used as the antenna for the NFC system 48. The terminals 44A⁻ and 44A⁺ act as the input 66 and output 68 for signal transmission from and/or to the device 52 in a NFC mode.

Figure 16:
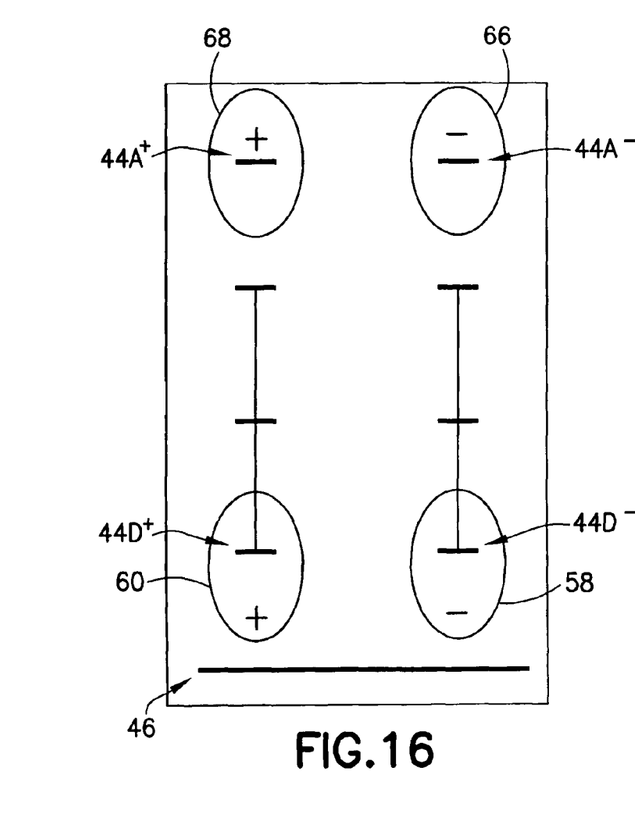
FIG. 16 is a diagram similar to FIG. 10 showing use of the coil loops for both Near Field Communication and inductive charging.
Figure 17:
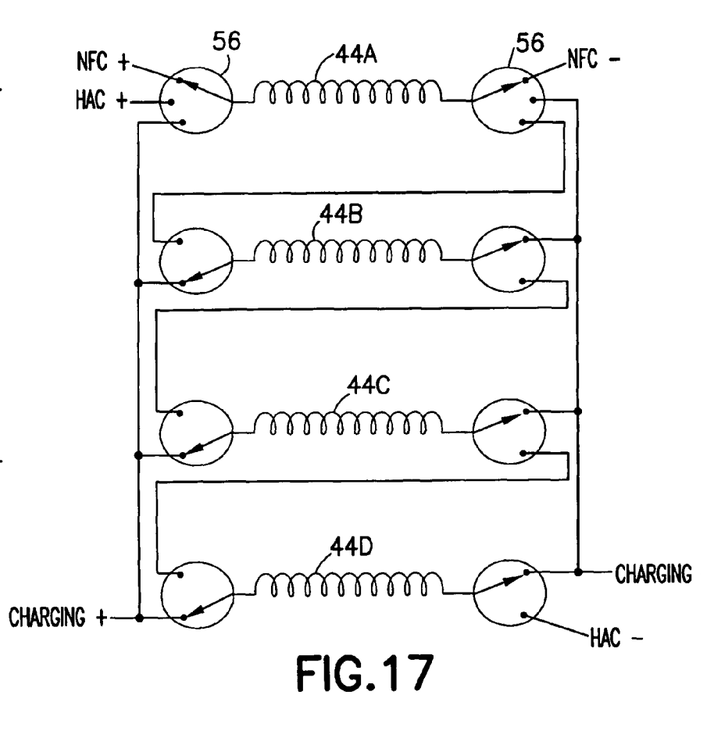
FIG. 17 is a diagram related to FIG. 16 showing use of the switchers of the apparatus to provided the electrical connection shown.

Referring particularly to FIGS. 16-17, use of the coil 38 in the NFC system 48 for a NFC feature or application, and also in the inductive charging system 34 for a charging feature or application can be understood. The switchers 56 are activated by the controller 20 to connect the top trace 44A to the NFC+ and NFC−. The rest of the traces 44B-44D are connected in parallel with the terminals 44D⁻ and 44D⁺ acting as the input 58 and output 60 to Charging− and Charging+, but with only three of the traces 44B, 44C, 44D connected in parallel.

In the HAC position (FIGS. 12-13) the separate coil layers 44 are connected in series. In wireless charging mode (FIGS. 10-11) the coil layers 44 are connected in parallel to have minimum resistance. The coil works here as a Litz coil to reach maximum connection efficiency. In the combined NFC and charging mode (FIGS. 16-17) one layer is used for NFC, and the other layers are used for charging. The NFC circuitry can have an additional low-pass filtering (serial capacitor) below to separate 100 kHz charging signal from NFC (13.56 MHz).

The example of FIG. 2 proposes a coil location in a monoblock mobile phone. The coil is located at a back-side of the phone to allow the user to see the display when the phone is placed on a charger pad. The coil is placed in a top-part of the phone to maximize the HAC performance. HAC is measured from acoustical earpiece area and battery is often a strong noise source for HAC so coil and battery should not be placed in top of each other. Positioning the coil in the top-part of the phone also allows user to touch NFC tags when device is in hand in natural hand-grip position (microphone-side on palm).

In the past, near-field communication (NFC) and inductive-based wireless charging both needed their own separate coils to work. These coils were relatively large. The coil types for a NFC antenna and an inductive-based wireless charging are very similar in both cases. Thus, it has been discovered that these applications can use at least some same components. Additionally, it has been discovered that Hearing Aid Compatibility (HAC) can be created by driving audio signal into a same coil used as the NFC antenna and the inductive charging system coil. In conventional devices, on the other hand, HAC, NFC and wireless charging are all implemented in mobile phones with their own discrete (large-sized) components. It has been discovered that these functionalities can use one common coil to save space and component cost.

In conventional devices, HAC, NFC and wireless charging all have had separate dedicated components including a separate coil/antenna. All three applications are based on inductive connection, so they need some large-sized coil to work as a transducer/receiver. These applications work in different frequency areas. However, with additional filtering even same-time multi-tasking use of a single coil for more than one of these applications is possible.

In an example embodiment, just one common coil can be implemented into phone back-cover; instead of many application-specific coils/antenna. This one coil can be used at least for three different purposes:

- Wireless charging (such as in the 100 kHz area for example);
- Near-field communication according to NFC standard (such as in the 13.5 MHz area for example); and/or
- Hearing Aid Compatibility (such as in the 100-8000 Hz frequency area for example).

Additionally, in an example embodiment, just two out of these three functionalities can be implemented. In one type of example embodiment, one relatively large-sized multi-purpose coil is provided at a back-cover (top part of the phone). This placement can provide advantages such as:

- Wireless charging application use prefers that the conduction charging coil should be in the back side of the phone to allow the user to see the phone display when the phone is placed on a charging pad;

NFC application use prefers that the coil antenna be in an upper part of the phone so that NFC tag touching is easy when the phone is in a hand of the user in normal way;

HAC application use prefers that the coil be nearby the acoustical earpiece/transducer for HAC standards with magnetic (audio frequency) field being measured in front of the earpiece outlet;

Distance between the coil and the battery can be maximized because the battery might create disturbances to HAC performance.

In example embodiments the coil can have several different outputs (high impedance, low impedance) for different applications as ideal impedance for NFC and wireless charging means too low impedance (~2 ohm) if HAC is created by using normal audio amplifier (optimized for 8 ohm load for example). An advantage is to decrease the number of components in an apparatus. The wireless charging application needs a coil which is larger than the size of the coil needed for NFC. Thus, a common coil total size can be defined by the wireless charging application, perhaps without using the entire size of the coil for NFC in one example. However, some additional coil rounds/loops (with separate connection points) might be provided to make the coil configured for optimum performance for all purposes.

In mobile phones there are several different interface technologies using coil-type transducer for short-distance wireless connection such as NFC (Near-Field Communication), Wireless Charging, and HAC (Hearing-aid Compatibility), etc. for example. Each application has different needs for coil characteristics, so in the past it was not possible to use just one common coil as such for all these purposes. But as needed coils are very big compared to size of the product, there is a strong need for using one coil for multiple purposes. This is possible by a coil/switch combination in one type of example embodiment.

As noted above, wireless charging, Near-field communication and HAC all have separate dedicated coils. These are expensive components and, due to their large size, they are difficult to place into a small portable product. With features described herein, one coil can be used for multiple purposes. In conventional mobile telephones, many separate coils were needed as electrical characteristics are different for each application. Litz-wire coils are used for wireless charging to have good efficiency, but then the coil has too few rounds (with low impedance and poor magnetic flux) for HAC. Total conductor thickness for NFC is lower than desired for wireless charging, so a NFC coil antenna could only be used partially for wireless charging. Additionally, with an example embodiment this common coil can be used as an FM radio antenna, and for both RX and TX directions.

In some conventional mobile telephones, the conduction coil for wireless charging is normally printed on a flex, and it has several conduction layers to reach needed efficiency (a Litz coil). Normally these coil layers are connected in parallel. By multiplexing these conduction layers with additional switcher(s), coil electrical characteristics can be changed and a same coil can be used for multiple purposes. Instead of separate dedicated transducer coils for Wireless charging, NFC and HAC, just one large-sized coil can be implemented into the back of the phone. The coil can be connected to a multiplexer so coil layers can be connected in serial or parallel, or perhaps just one coil layer can be used at time. One possibility is also to use one wireless charging layer for NFC while other layers are used for charging to allow both NFC and wireless charging at same time.

An advantage with example embodiments is that less large-sized coils are needed. This results in savings in product size and component cost. An additional switcher/multiplexer can be provided including system-level software support for this solution. Anyhow this multiplexer can replace some existing switchers such as the charging switcher connecting the coil to the apparatus battery.

An example embodiment may be provided as an apparatus 10 comprising an inductive charging system 34 configured to charge a rechargeable battery 26, where the inductive charging system comprises an induction coil 38; and at least one wireless communication system such as 48 and/or 50 configured to communicate with a device such as 52 or 54, the wireless communication system comprising at least a portion of the induction coil 38 for transmitting and/or receiving a wireless signal such as 53 (see FIG. 8) at the induction coil 38, or for generating a communication electromagnetic field such as 55 (see FIG. 9) at the induction coil, where both the inductive charging system 34 and the wireless communication system 48 and/or 50 comprise at least a portion of the induction coil 38 as a common component for both of the systems.

The at least one wireless communication system may comprise a hearing aid compatibility (HAC) system 50 configured to generate an electromagnetic field from the induction coil 38. The at least one wireless communication system may comprise a near field communication (NFC) system 48 configured to use the portion of the induction coil as a near field communication antenna. The apparatus may be configured to use the coil at a same time for the induction charging system 34 and the near field communication system 48. The at least one wireless communication system may comprise an FM radio receiver configured to use the portion as an FM radio antenna. The induction coil may comprise multiple separate coil loops 44 and circuitry 56 configured to selectively use the separate coil loops. The apparatus may be configured to adjust or select the correct coil impedance depending upon how (or what system) the coil is going to be used. The circuitry may comprises a multiplexer. The circuitry may comprises multiple switchers. The apparatus may comprise means for selectively using separate coil loops of the induction coil.

Figure 18:
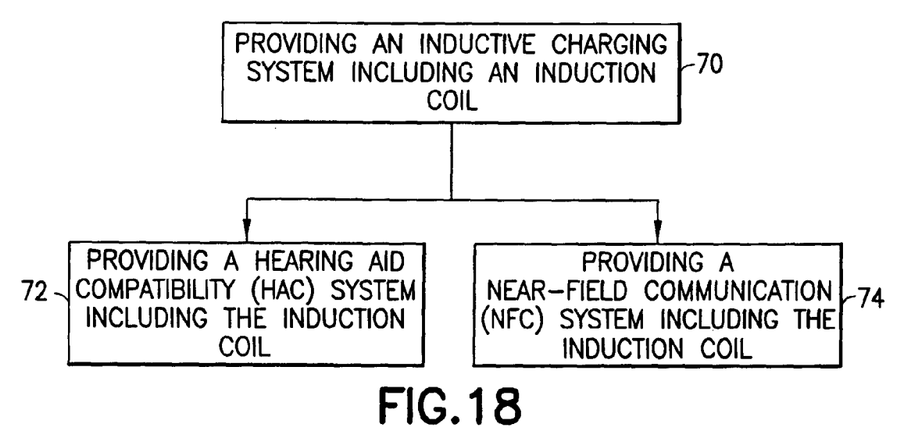
FIG. 18 is a diagram illustrating an example method.

Referring also to FIG. 18 an example method may comprise providing an apparatus comprising an inductive charging system as indicated by block 70 configured to charge a rechargeable battery, where the inductive charging system comprises an induction coil; and providing the apparatus with at least one wireless communication system as indicated by either or both of blocks 72 and 74, where a first one of the wireless communication system comprises at least a portion of the induction coil, where the wireless communication system is configured to use the induction coil to communicate with a device.

The first wireless communication system may comprise a hearing aid compatibility (HAC) system configured to generate an electromagnetic field from the induction coil. A second one of the wireless communication system may comprise a near field communication (NFC) system configured to use the portion of the induction coil as a near field communication antenna. The first wireless communication system may comprise a near field communication (NFC) system configured to use the portion of the induction coil as a near field communication antenna. The induction coil may be provided as multiple separate coil loops, and the apparatus may comprise circuitry configured to selectively use the separate coil loops.

Figure 19:
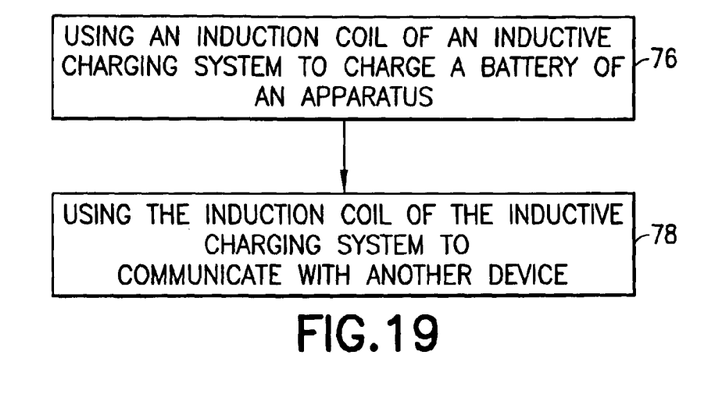
FIG. 19 is a diagram illustrating another example method.

Referring also to FIG. 19 an example method may comprise using an inductive charging system to charge a rechargeable battery of an apparatus, where the inductive charging system comprises an induction coil as indicated by block 76;

and using the induction coil as part of a wireless communication system to generate a communication electromagnetic field from the induction coil, or to transmit and/or receive a wireless signal at the induction coil as indicated by block 78.

The induction coil may be used as a coil of a hearing aid compatibility (HAC) system configured to generate the communication electromagnetic field from the induction coil. The induction coil may be used as a near field communication antenna of a near field communication (NFC) system. The induction coil may be used as the near field communication antenna and the induction coil for the inductive charging system at a same time.

In one type of example embodiment a non-transitory program storage device readable by a machine such as memory 24 or a CD-ROM or flash memory for example, tangibly embodying a program of instructions executable by the machine for performing operations, may be provided where the operations comprise charging a rechargeable battery of an apparatus by an inductive charging system comprises an induction coil; and communicating with a device by use of the induction coil, where the induction coil generates a communication electromagnetic field from the induction coil, or to transmit and/or receive a wireless signal at the induction coil.

Figure 20:
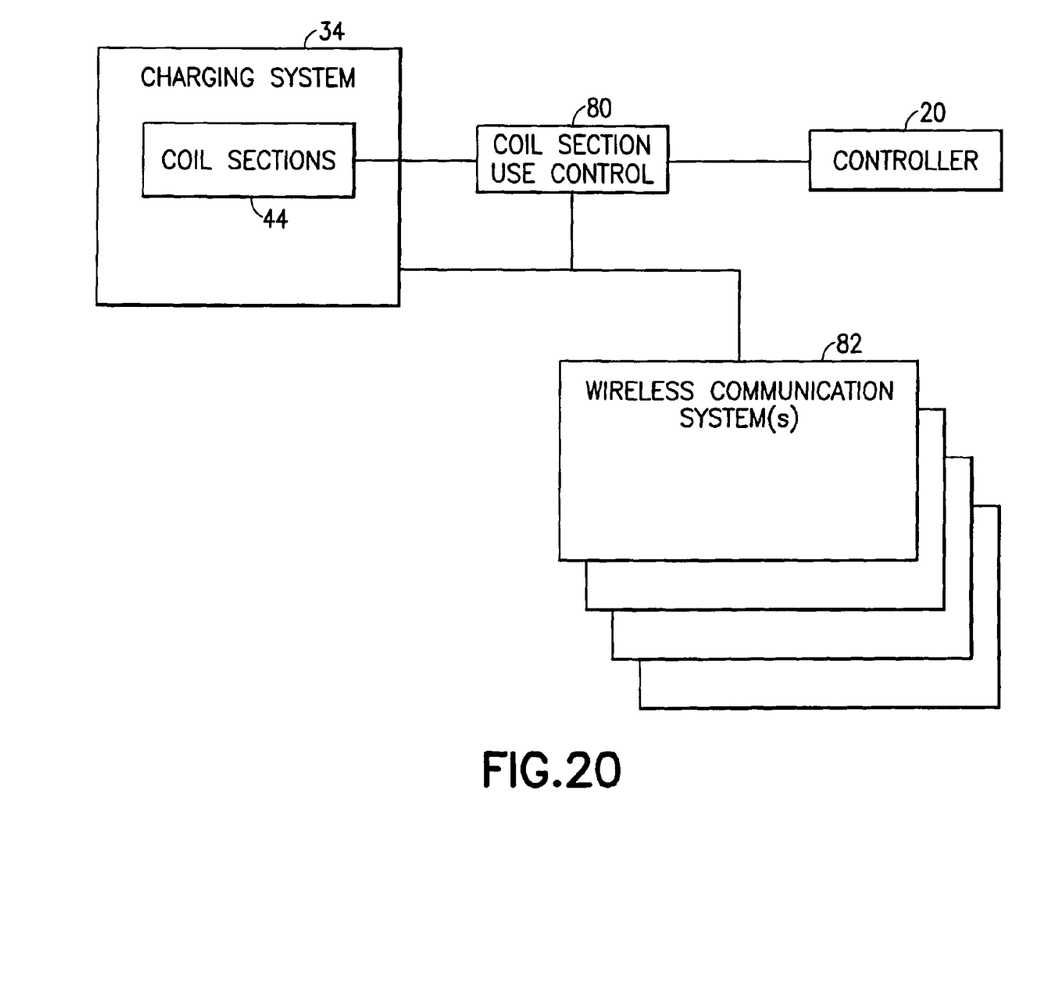
FIG. 20 is a diagram illustrating an alternate example embodiment.

Referring also to FIG. 20, the features described above are not limited to use merely with HAC and/or NFC systems. One or more wireless communications systems 82 could be provided including HAC, NFC, FM radio, GPS, LAN, RFID, or any other radio communication where at least one of the coil sections 44 of the induction coil of the inductive charging system 34 is used as a receiving antenna and/or transmitting antenna. The coil section use control 80, which controls which coil sections 44 are used and/or how the coil section(s) are connected to each other and/or how the coil section(s) are connected to other circuitry, could comprise any suitable circuitry including, for example, switchers or a multiplexer. The coil section use control 80 can be controlled by the controller 20 based upon, for example, a user selection or a mode in which the apparatus 10 is being used.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   an inductive charging system configured to charge a rechargeable battery, where the inductive charging system comprises an induction coil; and
   at least first and second wireless communication systems configured to communicate with respective devices,
   the first wireless communication system comprising at least a first portion of the induction coil for transmitting and/or receiving a wireless signal at the induction coil,
   the second wireless communication system comprising at least a second portion of the induction coil for generating a communication electromagnetic field at the induction coil,
   each of the first and second wireless communication systems shares at least a respective part of the induction coil as a common component with the inductive charging system,
   where the first wireless communication system comprises a near field communication (NFC) system configured to use the first portion of the induction coil as a near field communication antenna, and
   where the second wireless communication system comprises a hearing aid compatibility (HAC) system configured to generate an electromagnetic field from the induction coil.

2. An apparatus as in claim 1 where the apparatus is configured to use the induction coil at a same time for the induction charging system and the near field communication system.

3. An apparatus as in claim 1 where the first wireless communication system comprises a FM radio receiver configured to use the portion as an FM radio antenna.

4. An apparatus as in claim 1 where the induction coil comprises multiple separate coil loops and circuitry configured to selectively use the separate coil loops.

5. An apparatus as in claim 4 where the circuitry comprises a multiplexer.

6. An apparatus as in claim 4 where the circuitry comprises multiple switchers.

7. An apparatus as in claim 1 further comprising means for selectively using separate coil loops of the induction coil.

8. The apparatus of claim 1, wherein said induction coil is configured to selectively provide different outputs based on whether the electromagnetic field is being generated from the induction coil by the RAC system or the induction coil is being used as a near field communication antenna by the NFC system.

9. A method comprising:
   providing an apparatus comprising an inductive charging system configured to charge a rechargeable battery, where the inductive charging system comprises an induction coil; and
   providing the apparatus with at least first and second wireless communication systems,
   where the first and second wireless communication systems comprise at least first and second portions of the induction coil, respectively,
   where the first and second wireless communication systems are configured to use the induction coil to communicate with respective devices,
   where the first wireless communication system comprises a near field communication (NFC) system configured to use the first portion of the induction coil as a near field communication antenna, and
   where the second wireless communication system comprises a hearing aid compatibility (HAC) system configured to generate an electromagnetic field from the induction coil.

10. A method as in claim 9 where the induction coil is provided as multiple separate coil loops, and the apparatus comprises circuitry configured to selectively use the separate coil loops.

11. The method of claim 9, including configuring the induction coil to selectively provide different outputs based on whether the electromagnetic field is being generated from the induction coil by the HAC system or the induction coil is being used as a near field communication antenna by the NFC system.

12. A method comprising:
   using an inductive charging system to charge a rechargeable battery of an apparatus, where the inductive charging system comprises an induction coil; and using the induction coil as part of a wireless communication system to generate a communication electromagnetic field from the induction coil, and to transmit and/or receive a wireless signal at the induction coil where the induction coil is used as a coil of a hearing aid compatibility (HAC) system configured to generate the communication electromagnetic field from the induction coil, and the induction coil is used as a near field communication antenna of a near field communication (NFC) system.

13. A method as in claim 12 where the induction coil is used as the near field communication antenna and the induction coil for the inductive charging system at a same time.

14. The method of claim 12, including selectively providing different outputs from the induction coil based on whether the electromagnetic field is being generated from the induction coil by the HAC system or the induction coil is being used as a near field communication antenna by the NFC system.

15. A non-transitory program storage device readable by a machine, tangibly embodying a program of instructions executable by the machine for performing operations, the operations comprising:

charging a rechargeable battery of an apparatus by an inductive charging system comprises an induction coil;

communicating with a first device by use of the induction coil, where the induction coil generates a communication electromagnetic field from the induction coil; and communicating with a second device by use of the induction coil, where the induction coil transmits and/or receives a wireless signal at the induction coil.

16. The non-transitory program storage device of claim 15, the operations including selectively providing different outputs based on whether the induction coil generates a communication electromagnetic field from the induction coil or transmits and/or receives a wireless signal at the induction coil.

* * * * *

UNITED STATES PATENT AND TRADEMARK OFFICE
CERTIFICATE OF CORRECTION

| | | |
|---|---|---|
| PATENT NO. | : 9,024,576 B2 | Page 1 of 1 |
| APPLICATION NO. | : 13/298709 | |
| DATED | : May 5, 2015 | |
| INVENTOR(S) | : Maenpaa | |

It is certified that error appears in the above-identified patent and that said Letters Patent is hereby corrected as shown below:

In the Claims

Claim 8, col. 12, line 28 "RAC" should be deleted and --HAC-- should be inserted.

Signed and Sealed this
Twenty-third Day of June, 2015

Michelle K. Lee
*Director of the United States Patent and Trademark Office*